United States Patent [19]

Saeed

[11] Patent Number: 6,019,867
[45] Date of Patent: Feb. 1, 2000

[54] USE OF GLYCOL PRODUCTION UNIT WASTE STREAMS FOR PRODUCTION OF RESOLE BONDED LAMINATES

[75] Inventor: Mahmood Ahmad M. Saeed, Lahore, Pakistan

[73] Assignee: Saudi Basic Industries Corporation, Saudi Arabia

[21] Appl. No.: 08/753,678

[22] Filed: Nov. 27, 1996

[51] Int. Cl.⁷ .................................................. C09J 4/00
[52] U.S. Cl. ................. 156/335; 156/307.3; 156/307.7; 428/411.1; 428/424.8; 428/478.8; 428/479.6; 442/59; 528/129
[58] Field of Search ............ 442/59; 428/411.1, 428/424.8, 478.8, 479.6; 156/335, 307.3, 307.7; 528/129

[56] References Cited

U.S. PATENT DOCUMENTS

| | | |
|---|---|---|
| 2,441,860 | 5/1948 | Whetstone . |
| 3,025,255 | 3/1962 | Lambuth ................................ 260/17.2 |
| 3,438,850 | 4/1969 | Le Blanc et al. ........................ 161/232 |
| 3,661,814 | 5/1972 | Smith et al. ............................ 260/17.2 |
| 3,725,349 | 4/1973 | Smith et al. .............................. 260/58 |
| 3,857,815 | 12/1974 | Smith et al. ............................ 260/51.5 |
| 4,202,945 | 5/1980 | Leinhardt ................................. 521/121 |
| 4,803,115 | 2/1989 | Fushiki et al. ........................... 428/285 |

FOREIGN PATENT DOCUMENTS

| | | |
|---|---|---|
| 01075563 | of 0000 | Japan . |
| 49116182 | of 0000 | Japan . |

OTHER PUBLICATIONS

A report generated from an online "Dialog System" database search. 7 pages.

A summary of patent abstracts entitled "Phenol–Formaldehyde Resols/Patent Summary." pp. 52–55.

Richard Lewis Hawley's Condensed Chemical Dictionary, 12th edition, Van Nostrand Reinhold, pubs., 1993, p. 391, 487, 488, and 1129.

*Primary Examiner*—Jeffrey Stucker
*Attorney, Agent, or Firm*—Akin, Gump, Strauss, Hauer & Feld

[57] ABSTRACT

Mixed glycols, as exist in the waste stream from a glycol production unit, are utilized for production of a liquid resole resin in an aqueous alcoholic solvent. The solvated resole resin is employed as a binder for production of laminates.

13 Claims, No Drawings

USE OF GLYCOL PRODUCTION UNIT WASTE STREAMS FOR PRODUCTION OF RESOLE BONDED LAMINATES

BACKGROUND OF THE INVENTION

1. Technical Field of Invention

This invention relates to the production of resole resins and bonded laminates.

2. Description of Related Art

Ethylene glycol may be produced on an industrial scale by the hydrolysis of ethylene oxide in a large excess of water to obtain 85–90% monoethylene glycol (MEG). By-products produced in this reaction are lower polyglycols including diethylene, triethylene and tetraethylene glycols. The reaction effluent from the hydrolysis reaction is first treated in a series of multiple-effect evaporators to reduce its water content after which ethylene glycol (MEG) is refined by vacuum distillation. The residual or waste stream from the vacuum distillation tower typically comprises a polyglycol by-product content of from about 1 to about 2 wt % of the ethylene oxide utilized for the reaction and, to this extent, represents an economic wastage of ethylene oxide as well as presenting a disposal problem. In such glycol production unit waste streams, triethylene glycol (TEG) and tetraethylene glycol (Tetra EG) comprise the bulk of the polyglycol content of the waste stream.

Methanol may be produced on an industrial scale by the reaction of a synthesis gas, composed of carbon monoxide, hydrogen and some carbon dioxide, over an appropriate catalyst. The methanol product is recovered from the crude reaction mixture by distillation in a finishing column wherein at least 98 wt % of the methanol content of the column feed is recovered as a column overhead product which is 99.85 wt % or greater methanol, whereas the bottom stream from the column may account for about 2 wt % of the methanol content of the column feed in combination with a mixture of other alcohols and water. Typically this bottom stream on a weight basis comprises from about 45–65 wt % methanol; 10–20 wt % of mixed alcohols including ethanol, propanol, butanol and higher alcohols; and 15–45 wt % water. It is not economically practical to recover the methanol content from this bottom stream by further distillation, hence this content represents an economic wastage. The column bottoms pose a problem also with respect to their disposal in an environmentally sound manner.

As is the case with any industrial waste stream, it is always a desired goal in the art to discover a utilization for such materials which reduce or eliminate the problem of its disposal, and particularly to discover a utilization which is practical of an economic application.

SUMMARY OF THE INVENTION

This invention comprises the discovery of a practical and economically beneficial utilization for the mixed glycol waste stream from a glycol production unit. In a further aspect of this invention it has been discovered that the mixed alcohol aqueous waste stream from a methanol production unit may also be beneficially used in conjunction with that of the waste stream from a glycol production unit. From a practice of this invention, an economically viable product is produced which incorporates within its structure components present in the glycol production unit waste stream. The products produced by practice of this invention are decorative and industrial laminates composed of kraft paper or other textile and as a binder therefore a glycol modified resole resin formed from the glycol components of a glycol production unit waste stream as reacted with appropriate quantities of formaldehyde and phenol in an alcoholic solvent which may comprise the mixed alcohol aqueous waste stream from a methanol production unit.

The glycol modified phenolic resins produced by practice of this invention have unusual and valuable properties when utilized for the impregnation of kraft papers and cotton fabrics which are then used to produce decorative and industrial laminates and composites, etc.

DESCRIPTION OF THE PREFERRED EMBODIMENTS

This invention utilizes mixed glycols for production of a liquid resole resin which is soluble in an aqueous alcoholic solvent. The solvated resole resin is employed as a binder for production of laminates and composites by impregnation of the solvated resin into kraft paper and cotton fabrics which are then subjected to laminating/compositing processing conditions, such as press molding. The finished laminate/composite product possesses excellent properties with respect to tensile and flexural strengths and hardness and possess excellent resistance to heat, acids, alkalis and organic solvents.

Mixed glycol constituents as typically found in the waste stream of a glycol production unit are suitable for use in practice of this invention. Typically, a waste stream from a glycol production unit contains as a glycol content from about 0 to about 15 wt % diethylene glycol (DEG), from 30 to about 55 wt % triethylene glycol (TEG), from about 45 to about 55 wt % tetraethylene glycol (Tetra EG), and other higher glycols in an amount of from about 0 to about 3 wt %.

The resole resin is produced by reacting the glycol content of such glycol production unit waste stream with formaldehyde and phenol in proportions wherein the total glycol content is from about 15 to 40% of the weight of the phenol and the molar ratio of formaldehyde to phenol is from about 1.2 to about 1.8.

The resole forming reaction is conducted in the presence of an alcoholic solvent which may be an aqueous solution of mixed alcohols such as are typically found in the waste stream of a methanol production unit. Typically a waste stream from a methanol production unit contains about 45–65 wt % methanol; 10–20 wt % of mixed alcohols comprising ethanol, propanol, butanol and higher alcohols; and 15–45 wt % water.

The resole forming reaction is carried out by bringing the phenol and formaldehyde together in the presence of a base catalyst at a temperature appropriate to initiate the phenol-formaldehyde reaction. The mixed glycols for resin modification may be added to the reactor with the initial charge of phenol and formaldehyde or the mixed glycols may, and preferably are, added to the reaction mass after a phenol-formaldehyde reaction has been initiated. The alcoholic solvent may be added in whole or in part as a part of the initial charging of the reactor and it is preferred to split the total of alcohol utilized so that a portion of such alcohol is added with the initial charge of phenol, formaldehyde and catalyst and the remainder of the alcohol is added to the reaction mass after the initiation of the phenol-formaldehyde reaction and the addition of the mixed glycols.

The formaldehyde for the reaction can suitably be any of the readily available commercial forms of formaldehyde such as 37 wt % formaldehyde in water solution with a minor amount of an alcohol stabilizer or the source of the formaldehyde may be, and preferably is, paraformaldehyde. When paraformaldehyde is used at least a portion of the alcohol solvent may be added to the phenol in the reactor to dissolve it and the paraformaldehyde may be added in its solid form to the reactor or it may be predissolved in a portion of the alcohol solvent to be used and added to the reactor in this alcohol solution form.

The catalyst for the reaction can be any base commonly used for production of phenol-formaldehyde resins such as an alkali metal hydroxide, an alkali metal carbonate or an alkali metal bicarbonate. As a catalyst NaOH, $Na_2CO_3$ and $NaHCO_3$ are suitable and NaOH is preferred. Small quantities of $Na_2CO_3$ and $NaHCO_3$ which are present in the waste glycol stream, typically about 1–2 wt %, may in combination with the preferred NaOH also function in a catalyst capacity.

The glycol modified resole resins of this invention are formed by reaction of formaldehyde (f) with phenol (p) in a molar ratio (f/p) of from about 1.2 to 1.8, preferably from about 1.2 to 1.6 and more preferably from about 1.4 to about 1.6, at a temperature of about 90° C. while exposing the formaldehyde and phenol reactants during the resole forming reaction to the presence of a mixed glycol composition containing triethylene glycol and tetraethylene glycol in an amount such that the total glycol content of the mixed glycol composition comprises from about 15 to about 40% of the weight of the phenol reactant, and preferably from about 15 to 35% of the weight of the phenol reactant, and most preferably from about 17 to about 26% of the weight of the phenol reactant. Generally the reactants are maintained in contact at a reaction temperature of 80–90° C. and allowed to react until a viscosity of from about 8–30 cp is observed after which the reaction mass may be cooled to 55° C. or less and an alcoholic solvent may be added to adjust the final resin formulation to a desired non-volatile content of from about 40 to about 50 wt %. Wherein a non-volatile content of from about 45–46% is desired for the final resin it is preferred to allow the reaction to proceed until a viscosity of from about 8 to about 12 cp is observed, and for a non-volatile content of 48–50% it is preferred to allow the reaction to proceed until a viscosity of from about 25 to 30 cp is observed.

The examples which follow illustrate production of glycol modified phenolic resins and the production of laminate articles using such resins in accordance with the invention.

EXAMPLES

Examples 1–5

For the following examples mixed glycol compositions that are representative of the composition of a mixed glycol waste stream from a glycol production unit, as described in Table 1 below, were utilized in the production of a phenolic resin.

TABLE 1

| Component (wt %) of Mixed Glycol | Example 1 | Example 2 | Example 3 | Example 4 | Example 5 |
|---|---|---|---|---|---|
| MEG | 11.6 | 18.9 | 16.6 | 0 | 0 |
| DEG | 2.8 | 4.9 | 5.4 | 13.5 | 0.1 |
| TEG | 6.5 | 6.2 | 6.6 | 32.9 | 52.5 |
| Tetra EG | 2.3 | 4.9 | 5.7 | 50.4 | 45.6 |
| Other Glycol | 0 | 0.1 | 0.6 | 2.0 | 1.7 |

TABLE 1-continued

| Component (wt %) of Mixed Glycol | Example 1 | Example 2 | Example 3 | Example 4 | Example 5 |
|---|---|---|---|---|---|
| Total Glycol | 23.17 | 35.0 | 34.9 | 98.8 | 99.9 |
| Water | 76.8 | 65.0 | 65.1 | 1.2 | 0.1 |

Water was added to each mixed glycol composition sufficient to yield a final water content for each of 80 wt % (hereafter referred to as "mixed glycol 20%") and each mixed glycol composition was used to prepare a phenolic resin according to the following formulation:

| Phenol | 94 g (1 mole) |
| Formaldehyde (37%) | 122 g (1.5 mole) |
| Mixed Glycol 20% | 80 g |
| NaOH 50% | 4 g |
| Methanol | 60 g |

Phenol was charged to 1 liter 3-neck flask fitted with condenser and an agitator. Formaldehyde 37 wt % in a water-alcohol solvent, mixed glycol and NaOH were added under stirring and heating was started. The temperature of the mixture was raised to 50° C. Heating was discontinued after an exothermic reaction started and the temperature reached 80–90° C. The reaction was continued for about 3 hours until the temperature dropped to 70–75° C. Methanol was then slowly added through the condenser and the mixture was maintained at a temperature of 60–65° C. for a further 3 hours. Thereafter, the reaction mixture was cooled in the flask and the reaction contents were tested for viscosity, pH, density and non-volatile content at 105° C. for 3 hours in the oven, curing time at 120° C. and water tolerance as measured according to DIN 16916-02-M Standard. The test results of these examples are tabulated in Table 2.

TABLE 2

| RESULTS | Example 1 Resin | Example 2 Resin | Example 3 Resin | Example 4 Resin | Example 5 Resin |
|---|---|---|---|---|---|
| Viscosity @ 20 C., cp | 7.0 | 8.0 | 8.0 | 9.0 | 9.0 |
| pH @ 20° C. | 8.9 | 8.7 | 8.7 | 8.5 | 8.5 |
| Sp. gr @ 20° C. | 1.025 | 1.030 | 1.030 | 1.035 | 1.035 |
| Non-Volatile Content @ 105° C., % | 39.9 | 40.7 | 40.3 | 41.5 | 41.1 |
| Curing Time @ 120° C., Min. | 6–7 | 7–8 | 7–8 | 6–7 | 6–7 |
| Water Tolerance @ 20° C. | 1.0:1.9 | 1.0:1.8 | 1.0:1.8 | 1.0:1.7 | 1.0:1.6 |

All resins of Example 1–5 were tested for manufacturing laminates based on Kraft paper and cotton fabrics by press molding at temperature=150° C., low pressure=50 psi for two minutes, high pressure=22 tons for 11 minutes and cooling for 11 minutes. All of the resin samples gave approximately the same performance; showing suitability of these glycol modified phenolic resins for laminates.

Examples 6–8

Alcohol mixtures representative of the composition of a waste stream from a methanol production unit were utilized in the process for producing a glycol modified phenolic resin. The composition of the alcohol mixtures used are given in Table 3 below.

TABLE 3

| Component (wt %) | Example 6 | Example 7 | Example 8 |
| --- | --- | --- | --- |
| Methanol | 46.3 | 62.6 | 54.5 |
| Ethanol | 4.6 | 10.4 | 7.5 |
| Propanol | 1.6 | 4.3 | 2.9 |
| Butanol | 0.2 | 0.4 | 0.3 |
| Other Alcohols | 1.5 | 4.2 | 2.8 |
| Water | 45.8 | 18.1 | 32 |
| Total Alcohols | 54.2% | 81.9% | 68% |

Three resin formulations were prepared based on the example 6–8 mixed alcohols as shown in Table 4. Paraformaldehyde was used as the formaldehyde source. The molar ratio of formaldehyde to phenol (f/p) f/p=1.5 and of catalyst to phenol (c/p) c/p=0.06 were kept constant in all the formulations. Also the total quantity of alcohols in each formulation was adjusted to 30% by weight of the final resin product by adding some methanol in the Example 6 resin formulation and by adding some water to the Example 7 and 8 resin formulations. The quantity of mixed glycols in each formulation was 6% by weight of final resin product.

TABLE 4

| Components (grams) | Example 6 Formulation | Example 7 Formulation | Example 8 Formulation |
| --- | --- | --- | --- |
| Phenol 90% (1 mole) | 105 | 105 | 105 |
| Paraformaldehyde 91% (1.5 mole) | 50 | 50 | 50 |
| NaOH 50% | 5 | 5 | 5 |
| Mixed Glycol of Example 4 | 20 | 20 | 20 |
| Mixed Alcohol of Table 3 | 115 | 122 | 147 |
| Methanol | 38 | — | — |
| Water | — | 31 | 5 |

The resin formulations were prepared by charging phenol and water to 1 liter 3-neck flask fitted with a condenser and an agitator. Paraformaldehyde, mixed alcohols, and NaOH were added under stirring and heating of the mixture was started. The temperature of the mixture was raised to 50° C. Heating was stopped after an exothermic reaction started and the temperature of the reaction mixture reached 90–95° C. A mixed glycol composition as described in Example 4 was added through the condenser, and the reaction was continued for about 3 hours until the temperature dropped to 70–75° C. Thereafter, methanol for the Example 6 formulation or water for the Example 7 and 8 formulations was slowly added through the condenser and the reaction mixture was maintained at 60–65° C. for a further 3 hours. Upon completion of the reaction the reaction mixture was cooled in the flask, recovered and tested for viscosity, pH, density, and non-volatile contents at 105° C. for 3 hours in the oven, curing time at 120° C. and water tolerance. The test results of all the resin formulations are given in Table 5.

TABLE 5

| Test Results | Example 6 Formulation | Example 7 Formulation | Example 8 Formulation |
| --- | --- | --- | --- |
| Viscosity @ 20° C., cp | 9 | 10 | 9.5 |
| pH @ 20° C. | 8.9 | 9 | 9 |
| Sp. gr. @ 20° C. | 1.038 | 1.042 | 1.04 |
| Non-volatile contents @ 105° C., % | 45.1 | 45.9 | 45.7 |

TABLE 5-continued

| Test Results | Example 6 Formulation | Example 7 Formulation | Example 8 Formulation |
| --- | --- | --- | --- |
| Curing time @ 120° C., min. | 6–7 | 7–8 | 8–7 |
| Water Tolerance | 1:1.9 | 1:1.7 | 1:1.5 |

Samples of laminates were prepared with resin formulations of Examples 6–8 using Kraft paper and cotton cloth by press molding at a temperature=150° C., Low Pressure=500 psi for 2 min., High Pressure=22 tons for 11 minutes and cooling for 11 minutes. All resin samples were more or less the same; showing suitability of fixed alcohols in the glycol modified resins for laminates.

Examples 9–22

In the following examples a floor stand, fully equipped, stainless steel pilot reactor of 25L capacity was used for preparation of glycol modified phenolic resins using a mixed glycol and/or mixed alcohol composition as indicated in Table 6 below. The mixed glycols utilized comprised 43–46% TEG, 50–54% tetra EG and 2–3% PEG. The molar ratio of formaldehyde to phenol for all resins was kept constant at f/p=1.5, and paraformaldehyde (91 wt %) was used as the formaldehyde source. The total quantity of alcohols in each final resin formulation was adjusted to 30 wt % and the total glycol content as a percentage of the total resin formulation varied between 5–10 wt % and as a percent of the weight of the phenol content varied between 17.7 and 35.5%. The quantities of water, alcohols and total glycols utilized in resin preparation are given in Table 6 below. For examples 9–14 of Table 6 the weight percent of water and total alcohols was determined by Karl-Fischer and GC whereas in Examples 15–22 these values are calculated quantities. The value of total glycols for all examples are the charged quantities for each formulation.

The reactor was loaded with the calculated amount of 90% w/w phenol at ambient temperature and the agitator was started. Thereafter the calculated amount of mixed alcohols, the calculated amount of NaOH (50% solution) to provide a c/p=0.05, and the calculated amount of paraformaldehyde at ambient temperature were loaded into the reactor. The mixed alcohols utilized were those as described in Example 8. Heating was started slowly and upon reaching 50–60° C., heating was stopped. At this point in the process an exothermic reaction occurred with a greater or lower speed according to temperature. Wherein a temperature increase of greater than 10° C. within a time period shorter than ten minutes was observed temperature control was exercised by means of cooling water.

When a temperature of about 80° C. was reached, the indicated amount of mixed glycols was added. The reacting mass was allowed to react until its viscosity reaches about 10–15 cp for a 50% non-volatile contents. Thereafter the reaction mass was cooled to 50–55° C. and the calculated amount of mixed alcohols was added to adjust the final non-volatile contents of the resin formulation to about 45–46%. The reaction was then continued until the desired value of viscosity in the range of 10–12 cp was obtained and then the reaction mass was cooled down as soon as possible to ambient temperature.

TABLE 6

Analysis of Phenolic Resins Manufactured on Pilot Plant

| Exp. No. | Batch Size Liters | Non-Volatile Contents wt % | Viscosity p @ 20° C. cp. F ball | Viscosity p @ 20° C. cp. Brook Field | Specific Gravity @ 20° C. g/cm | pH at 20° C. | Cure time at 120° C. ' = min " = sec. | Water Tolerance | Free Phenol wt % | Water wt % | Total Alcohols wt % | Total Glycols wt % |
|---|---|---|---|---|---|---|---|---|---|---|---|---|
| 9  | 5 L  | 50   | 28   | 28.9 | 1.066 | 10.2 | 6'-5"  | 1.0:1.0 | 4.8       | 18.7 | 25   | 5   |
| 10 | 5 L  | 50   | 22.9 | 21.5 | 1.056 | 10   | 9'-45" | 1.0:0.9 | 9.7–10.5  | 15.3 | 25.4 | 10  |
| 11 | 10 L | 52   | 26   | 25.9 | 1.056 | 10.6 | 5'-35" | 1.0:1.1 | 5.6       | 19   | 25   | 7.5 |
| 12 | 10 L | 48.9 | 26   | 25.3 | 1.06  | 10.3 | 6'-4"  | 1.0:1.1 | 7.3–8.4   | 18   | 26.5 | 7.5 |
| 13 | 10 L | 44.7 | 16.6 | 16   | 1.04  | 9.9  | 7'-1"  | 1.0:1.2 | 9.9       | 17.4 | 30   | 5   |
| 14 | 15 L | 45.7 | 13.7 | 13.5 | 1.05  | 9.5  | 8'-0"  | 1.0:1.4 | 7.8–11.6  | 22.6 | 29.6 | 6   |
| 15 | 20 L | 45.7 | 11.7 | 11.6 | 1.05  | 9.7  | 7'-0"  | 1.0:1.5 |           | 20   | 30   | 6   |
| 16 | 20 L | 45.8 | 11.8 | 11.7 | 1.048 | 9.8  | 7'-50" | 1.0:1.7 |           | 20   | 30   | 6   |
| 17 | 20 L | 45.9 | 11.9 | 11.7 | 1.046 | 9.9  | 6'-8"  | 1.0:1.9 |           | 20   | 30   | 6   |
| 18 | 20 L | 46   | 12   | 11.8 | 1.044 | 9.8  | 8'-10" | 1.0:1.0 |           | 20   | 30   | 6   |
| 19 | 20 L | 46.1 | 12.1 | 11.8 | 1.042 | 9.7  | 7'-11" | 1.0:1.1 |           | 20   | 30   | 6   |
| 20 | 20 L | 46.2 | 12.2 | 12   | 1.04  | 9.6  | 8'-12" | 1.0:1.2 |           | 20   | 30   | 6   |
| 21 | 19 L | 46.3 | 12.3 | 11.9 | 1.042 | 9.5  | 7'-13" | 1.0:1.3 |           | 20   | 30   | 6.3 |
| 22 | 20 L | 45.2 | 12   | 11.9 | 1.04  | 9.4  | 7'-0"  | 1.0:1.4 |           | 20   | 30   | 5.2 |

The resins of Examples 10, 12 and 14 were chosen for GC and GC/MS analyses of the unresinified components except for water which was determined by Karl Fischer method. In the alkaline reactions, preparation of resole, the reaction becomes more complicated owing to Canizzaro's reaction:

$$2HCHO+H_2O \rightarrow HCOOH+CH_3OH$$

$$2HCHO+Na(OH) \rightarrow HCOONa+CH_3OH$$

which reduces the quantity of formaldehyde even in the final product. The results are presented in Table 7.

TABLE 7

GC & GC/MS Analysis, Wt. %

| Unresinfied Components | Example 10 Resin | Example 12 Resin | Example 14 Resin |
|---|---|---|---|
| Methanol    | 7.23 | 6.39 | 6.14 |
| Ethanol     | 3.3  | 3.46 | 3.37 |
| Iso-Propanol| 0.49 | 0.52 | 0.49 |
| n-Propanol  | 1.29 | 1.35 | 1.34 |
| Butanol     | 0.27 | 0.28 | 0.28 |
| MEG         | 1.12 | 1.14 | 1.11 |
| Phenol      | 9.71 | 8.43 | 7.85 |
| TEG         | 0.01 | —    | 0.04 |
| Others      | 2.91 | 2.85 | 2.69 |

After each example the reactor equipment was cleaned by some mixed alcohols followed by hot water cleaning. It was not necessary to employ another solvent, such as acetone, to achieve a thorough clean-out of the apparatus.

Examples 23–25

Laminates were prepared using glycol modified resole resin formulations as prepared in Examples 9–22. As necessary water was added to a resin formulation to adjust it to a 46 wt % non-volatile content before using it for impregnation purposes. Kraft and decorative papers as described hereafter were impregnated by the dip process using Lab Coating and Impregnating Machine, made by WEB Processing (MIC) Ltd. U.K. Drying was carried out in a horizontal dryer. A running speed appropriate to the drying time, which depends on the heating system temperature used and the amount of water to be evaporated was selected. Drying temperature was generally in the range 120–150° C.

Composition of Laminates

Decorative and industrial laminates were prepared from different types of decorative and Kraft papers whose properties were suited to the intended application. The individual layers had the following designations:

Core-stock/Kraft Paper Sheet

Strongly absorbent Kraft paper without filler and consisting of unbleached sodium cellulose was used as the core-stock sheet with a resin loading as follows:

| Basic weight of paper (g/m$^2$) | about 170 | 124–130 | 149–150 |
|---|---|---|---|
| Resin content* (g/m$^2$) | about 79–81 | 68–75 | 65–68 |

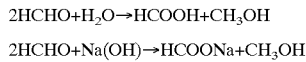

wherein A = basic weight of paper (g/m$^2$) and B = final weight of resin impregnated paper (g/m$^2$).

Decorative Sheet

A highly filled, absorbent grade of paper was used for the decorative sheet. This sheet had great hiding power to prevent the core layers from showing through. Paper to serve as decorative sheet was printed on one side with a design.

Basic weight of paper: about 80–120 g/m$^2$

Resin content *%: about 40–60% It is difficult to state optimum weights and resin contents for the paper in this instance. Both depend on the nature of the structure of the laminate.

Press Molding Conditions

Phenolic resins were cured at temperature between 130 and 160° C., preferably at 140° C. The impregnated and dried paper sheets were stacked in the required order and sandwiched between two metal plates. They were then run into a press heated under pressure with electric heating. Laminates with a phenolic resin core were press molded under a pressure of about 60 to 120 kg/cm$^2$ (850 to 1700 psi). The entire press molding cycle including heating and cooling, required 45–50 minutes, depending on the press molding temperature.

With high levels of atmospheric humidity care must be taken to prevent a water skin forming on the rollers, otherwise, the surface of the resin-impregnated paper may suffer and surface defects appear after press molding. The impregnated web was subsequently cut into sheets. The resin-impregnated material was stored in cool, dry premises, controlled to 40–45% relative atmospheric humidity and a temperature of about 20° C.

Volatile components and residual moisture, and hence the degree of drying of the paper, were determined as follows:

Specimens 100×100 mm were cut from the impregnated and dried paper. The specimens were dried in a drying cabinet for 5 minutes at 160° C. The weight loss relative to the weight of the specimens at the beginning of the test was calculated according to the formula:

$$V = \frac{(B - A) \cdot 100}{B}$$

where B=original weight of the impregnated and dried paper in g, A=weight of specimen in g after post-drying (5 minutes/160° C.) and V=volatile components, residual moisture in wt %. The conditions likely to produce the best results were determined by preliminary trials. They depend on the nature of the Kraft paper and the core material. For optimum results it was determined that decorative paper with resin content of about 50% may be dried to a weight loss of 6–8% and Kraft paper to weight loss of 5–7%, depending on its weight prior to impregnation and its resin content. Paper which was too damp displayed mat margins or even mat areas in the laminate after press molding. Excessive pre-curing of the resin impregnated paper often prevented the production of a sufficiently bonded surface in subsequent press molding.

Lamiates and a composite, prepared in accordance with the procedures described, are described in Table 8 below.

I claim:

1. A process for producing laminated articles, comprising the steps of impregnating a textile with a liquid resin formed by reaction of $CH_2O$ and phenol with a mixture of glycols comprising as a glycol content from about 0 to about 15 wt % diethylene glycol, from about 30 to about 55 wt % triethylene glycol and from about 45 to about 55 wt % tetraethylene glycol, wherein the $CH_2O$ to phenol molar ratio is from about 1.2 to about 1.8 and the glycol content of the mixture of glycols on a weight basis is from about 15 to about 40% of the initial weight of phenol, and forming the impregnated textile into a laminated article by press molding.

2. The process of claim 1 wherein said textile is Kraft paper, a wood based material or a cotton fiber.

3. The process of claim 2 wherein said textile is Kraft paper and is impregnated with said resin to a loading level of from about 30 to about 60 wt %.

4. The process of claim 3 wherein said impregnated Kraft paper is formed into a laminated article by press molding under a pressure of from about 60 to about 120 kg/cm².

5. A composition of matter, comprising a resin formulation containing a liquid resin formed by reaction of $CH_2O$ and phenol with a mixture of glycols comprising as a glycol content from about 0 to about 15 wt % diethylene glycol, from about 30 to about 55 wt % triethylene glycol and from about 45 to about 55 wt % tetraethylene glycol, wherein the $CH_2O$ to phenol molar ratio is from about 1.2 to about 1.8 and the glycol content of

TABLE 8

| | Example | | | | | | |
| --- | --- | --- | --- | --- | --- | --- | --- |
| | Example 23 | | | Example 24 | | | Example 25 |
| Property | Cellulose Exp. 10 Resin | Paper Exp. 12 Resin | Laminate Exp. 14 Resin | Cotton Exp. 10 Resin | Fabric Exp. 12. Resin | Laminate Exp. 14. Resin | Composite Exp. 14 Resin |
| Specific Gravity @ 23° C. | 1.39 +/− 0.1 | 1.36 +/− 0.03 | 1.34 +/− 0.06 | 1.26 +/− 0.05 | 1.32 +/− 0.06 | 1.33 +/− 0.03 | 1.27 +/− 0.04 |
| Water Absorption 24 h @ 23° C., (%) | 2.92 +/− 0.1 | 1.78 +/− 0.1 | 1.06 +/− 0.08 | 1.64 +/− 0.2 | 2.66 +/− 0.4 | 3.28 +/− 0.2 | 3.76 +/− 0.4 |
| Tensile Strength Ultimate (Mpa) | 32.7 | 110.7 | 138.7 | 85.3 | 53.7 55.2 | 68.5 | 4.5 |
| Flexural strength, (Mpa) | 186.4 | 200.6 | 180.0 | 66.6 63.1 | 58.2 | 140.9 130.2 | 86.8 |
| Flexural Modulus, (Mpa) | 19784 | 22205 | 22288 | 9686 | 5252 | 11890 10340 | 7858 |
| Izod Impact Strength (J/M) | 31.0 | 51.6 | 51.6 | flexible | 150 +/− 23 | 212.4 | 215.9 +/− 10.4 |

The invention has been described with reference to its preferred embodiments. Upon reading this description those of ordinary skill in the art may appreciate changes and modifications that may be made that do not depart from the scope and spirit of the invention as described above or claimed hereafter.

the mixture of glycols on a weight basis is from about 15 to about 40% of the initial weight of phenol.

6. The composition of claim 5, wherein said resin formulation further comprises a content of alcohols and water such that the resin formulation has an alcohol content of from about 15 to about 40 wt % and a water content of from about 10 to about 30 wt %.

7. The composition of claim 6, wherein said resin formulation has a non-volatile content after 3 hours at 105° C. of from about 35 to about 65 wt %.

8. The composition of claim 7, wherein said liquid resin is formed by reaction of $CH_2O$ and phenol in a mole ratio of from about 1.4 to 1.6 and the glycol content is about 15 to 35% of the initial weight of phenol.

9. The composition of claim 8, wherein the glycol content is from about 17 to about 26% of the initial weight of phenol.

10. An article of manufacture, comprising a laminated article formed by impregnating a textile with a liquid resin formed by reaction of $CH_2O$ and phenol with a mixture of glycols comprising as a glycol content from about 0 to about 15 wt % diethylene glycol, from about 30 to about 55 wt % triethylene glycol and from about 45 to about 55 wt % tetraethylene glycol, wherein the $CH_2O$ to phenol molar ratio is from about 1.2 to about 1.8 and the glycol content of the mixture of glycols on a weight basis is from about 15 to about 40% of the initial weight of phenol, and forming the impregnated textile into a laminated article by press molding.

11. The article of claim 10 wherein said textile is Kraft paper, a wood based material or a cotton fiber.

12. The article of claim 11 wherein said textile is Kraft paper and is impregnated with said resin to a loading level of from about 30 to about 55 wt %.

13. The article of claim 12 wherein said impregnated Kraft paper is formed into a laminated article by press molding under a pressure of from about 60 to about 120 $kg/cm^2$.

* * * * *